United States Patent Office 3,113,980
Patented Dec. 10, 1963

3,113,980
CATALYSTS AND PROCESS FOR THE SELECTIVE HYDROGENATION OF ACETYLENES
Ralph Lozelu Robinson, Norton-on-Tees, England, assignor to Imperial Chemical Industries Limited, London, England, a corporation of Great Britain
No Drawing. Filed Feb. 18, 1960, Ser. No. 9,441
Claims priority, application Great Britain Mar. 9, 1959
14 Claims. (Cl. 260—683)

This invention relates to catalytic reactions, such as mild hydrogenation reactions and to catalysts therefor. Among mild hydrogenation reactions is the selective hydrogenation of acetylenes in the presence of olefines. Industrially available olefines especially ethylene and propylene usually contain minor amounts of acetylenes, for example acetylene and methyl acetylene, which are injurious in many processes in which olefines are employed. It would be of great value to be able to hydrogenate these acetylenes at high efficiency to olefines with very little hydrogenation of olefines.

According to the present invention there is provided a catalyst suitable for mild hydrogenation and especially for the selective hydrogenation of acetylenes in the presence of olefines which comprises palladium supported on alumina whose pores have a mean radius not less than 100 Angstrom units and preferably not more than 1400 Angstrom units.

More preferably the pores of the alumina have a mean radius in the range 200 to 700 Angstrom units. By means pore radius is meant the parameter whose value is determined by the following method which is applied to samples of the catalyst each of which has been degassed at room temperature for 30 minutes at a pressure of $10^{-3}$ mm. or below.

(1) The density of the catalyst immersed in mercury at 20° C. and 900 mm. pressure, under which conditions about 15 minutes are allowed for attainment of equilibrium, is determined: this is the average density of solid containing pores not penetrated by mercury, that is pores of radius smaller than about $6 \times 10^4$ Angstrom units;

(2) The density of the catalyst immersed in helium at room temperature is determined: this is the true density of the ultimate solid material;

(3) The reciprocal of the density in helium is subtracted from the reciprocal of the density in mercury: the difference is equal to the total pore volume V per gram of catalyst;

(4) The surface area A per gram of the catalyst is found by the method of Brunauer, Emmett and Teller by measuring the quantity of argon adsorbed on the catalyst at −183° C.: in calculating the surface area the cross-sectional area of the argon atom is taken as 14.4 square Angstrom units;

(5) The mean pore radius $\bar{r}$ is determined by substituting the above determined volume V and area A in the formula $$\bar{r} = \frac{2V}{A}$$

which is derived on the assumption that the pores are cylindrical and of the same size. If the volume V is expressed in cubic centimetres and the area A is expressed in square centimetres the mean radius $\bar{r}$ is in centimetres and should be multiplied by $10^8$ to give the mean radius is Angstrom units.

In the preferred embodiment of the invention the pore radius distribution should be narrow since for example in catalysing the hydrogenation of acetylenes selectivity would be decreased by the presence of a large number of small pores even if many large pores were also present. Catalyst having this preferred narrow pore radius distribution are those which posses a surface area of 65 to 5 square metres per gram. Still more preferable are catalysts possessing a surface area in the range 30 to 10 square metres per gram. These numerically expressed limits apply when the area has been determined by the method described in the previous paragraph, sub-paragraph 4. The surface area used depends on reaction conditions, being greater for example when the space velocity is increased or the pressure is decreased or the temperature is decreased: however it is found that catalysts within the above ranges of area show acceptable selectivity and efficiency over quite a large range of reaction conditions.

The palladium content (calculated as the metal) of the catalysts according to the invention may be suitably within the range 0.01 to 5% by weight of the total catalyst and is preferably in the range of 0.01 to 0.4%. Smaller palladium contents e.g. 0.001% may however be used. The palladium content like the surface area is chosen in relation to the conditions under which the hydrogenation is to be performed. Thus a very suitable palladium content for a catalyst for the selective hydrogenation of small quantities of acetylenes in olefines is 0.04% when the space velocity of the gas is 7000 litres (corrected to 1 atmosphere pressure and 0° C.) per litre of catalyst filled space per hour at a pressure of 150–170 pounds per square inch gauge the temperature being 70° C. For higher space velocities or lower pressures or lower temperatures a higher palladium content is required to give optimum results: however it is found that the selectivity and efficiency of a catalyst of a particular palladium content are acceptable over quite a large range of reaction conditions.

In the preparation of the catalyst the palladium may be applied to the alumina support either before or after it has been treated to bring the mean pore radius and surface area of the alumina within the desired range, or partly before and partly after this.

Starting from active alumina the alumina support with the specified properties may be prepared by heating within the temperature range 800° C. to 1200° C. and preferably 940° C. to 1100° C. At 800° C. it is desirable to heat for at least 6 hours and at 1200° C. for at least 2 hours.

As a further feature of the invention therefore there is provided a process for producing a catalyst according to the invention which comprises heating active alumina at a temperature in the range 800° C. to 1200° C. and preferably a temperature in the range 940° C. to 1100° C. and depositing palladium thereon before or after the heat treatment. Preferably the palladium is deposited on the alumina after the heat treatment.

The active alumina starting material may be very suitably gamma-alumina, though other active modifications of alumina may also be used. If desired there may be used aluminium compounds which on heating yield active alumina which then is further heated as required by this feature of the invention. Highly inactive modifications such as corundum are not suitable. Using gamma-alumina the time of heating is suitably 2 to 6 hours though longer times may be used, especially at temperatures in the lower part of the range. As a result of the heat treatment the alumina is converted to a less active form having a mean pore radius as specified and a suitably small surface area. The still greater mean pore radii and still smaller surface areas which are produced by heating the alumina at higher temperatures for instance 1300° C. are less suitable for catalysts according to the invention since catalysts with such properties are not sufficiently active for convenient large scale use.

The following table shows the variation of mean pore radius and surface area with the temperature of the heating stage for typical alumina supports prepared from gamma-alumina, both inside and outside the recommended temperature ranges. The heating time was 4 hours throughout.

TABLE

| Temperature, ° C. | Mean Pore Radius, Angstrom units | Surface Area, square metres/gram |
|---|---|---|
| 650 | 84 | 73.7 |
| 700 | 87 | 73 |
| 750 | 92 | 70 |
| 800 | 101 | 64 |
| 850 | 122 | 54 |
| 900 | 156 | 40.6 |
| 950 | 208 | 32 |
| 1,000 | 275 | 22.1 |
| 1,050 | 420 | 16 |
| 1,100 | 677 | 11 |
| 1,150 | 990 | 7.5 |
| 1,200 | 1380 | 5.6 |
| 1,250 | 1860 | 3.9 |
| 1,300 | 2630 | 2.6 |

The alumina may be in the form of small lumps or pellets which may be of any shape for example spherical or cylindrical. A convenient pellet is a cylindrical pellet ⅛″ in diameter and ⅛″ in length.

The deposition of the palladium on the alumina may be carried out by a wet or dry process but is preferably carried out by a wet process. Very suitably an impregnation method is used with an aqueous solution of a palladium compound such as palladium salt for example palladium nitrate by stirring the alumina which may be in a pellet form in the palladium solution. The impregnated alumina is dried and may then if desired be treated one or more times with a palladium solution and dried. Drying is carried out at a temperature in the range 25° C. to 150° C. conveniently at about 100° C. In the preferred embodiment of the invention the impregnated alumina is now ready for use as a catalyst without further treatment but if desired it may be heated to decompose the palladium compound. A suitable temperature for this heating step is up to 500° C., temperatures in the range 150° C. to 450° C. being preferred. The catalyst may also be treated with hydrogen to complete the reduction to palladium metal for instance during the heating step just mentioned; or during an additional heating step (in which the temperature should be in the range 25° C. to 450° C.) after the first heating step but before use, or both. Preferably however the catalyst is brought into use without further treatment after it has been dried. Then reduction takes place under the reducing conditions which obtain e.g. in the selective hydrogenation of acetylenes. If the catalyst is reduced before use it may be allowed to cool under an inert atmosphere. It may be stored under an inert atmosphere but should not be kept for prolonged periods in hydrogen.

The catalysts of the invention promote mild hydrogenation reactions and especially the hydrogenation of acetylenes in presence of olefines, in which latter reaction they show a high degree of selectivity. They also show advantageous behaviour in other important ways. For instance they have a considerably reduced tendency to cause polymerisation of unsaturated gases passed over them and hence may be used for long periods without the need for costly shut-downs to clear the catalyst and plant of polymeric matter which is formed in side reactions by many catalysts of the prior art. They have the further advantage that they do not readily become overheated in the presence of $C_4$ and higher olefines in small concentrations for example of the order of 1% in mixtures whose main olefine constituents are ethylene and propylene. Although at sufficiently high temperatures the catalysts according to the invention do catalyse the hydrogenation of olefines the range of temperatures in which they catalyse predominantly the hydrogenation of acetylenes is remarkably wide in the presence of hydrogen both in the stoichiometric proportion and in excess, including large excesses for example 1000 or more times the concentration of acetylenes: hence reaction temperatures can be used at which the possibility of the initiation of olefine hydrogenation, resulting in increased temperature and thence in a runaway hydrogenation of olefines, is substantially eliminated. Therefore, using catalysts according to the invention, temperature control in the selective hydrogenation of acetylenes as minor constituents in mixtures of acetylenes and olefines is much facilitated, especially on the large scale where substantially adiabatic reaction conditions are encountered. There is less need, for example, to limit the difference in temperature between the inlet and outlet gases, and hence capital expense on for example intermediate cooling equipment is decreased. A still further advantage is that the catalysts give their optimum performance with little pre-treatment for instance with hydrogen or by conditioning in the reaction mixture itself.

As a further feature of the invention there is provided a process for the hydrogenation of unsaturated compounds in which is used a catalyst according to the invention. In particular this feature of the invention provides a process for the selective hydrogenation of acetylenes in gases containing olefines which comprises reacting the mixture of gases with hydrogen in the presence of a catalyst according to the invention at a temperature up to 250° C. Above 250° C. there is increasing tendency for olefine hydrogenation to occur. Preferably the temperature is within the range 60° C. to 150° C. and is increased through this range as the age of the catalyst increases.

It is a particular advantage of the use of the catalyst of the invention in the selective hydrogenation of acetylenes that the process may be operated efficiently at comparatively low temperatures, for example temperatures below about 150° C. Unused catalyst is active at temperatures as low as 60° C. to 70° C. Although the temperature required for efficient operation needs to be increased during the life of the catalyst the necessary rate of increase is slow. Thus for instance after 22 weeks' continuous operation a catalyst having a mean pore radius of 296 Angstrom units and a surface area of 20 square metres per gram still showed satisfactory activity and selectivity at an operating temperature of 110° C.

The total pressure at which the process of the invention is carried out may be atmospheric pressure or above or below atmospheric pressure. In the selective hydrogenation of acetylenes in gases containing olefines the pressure is preberably in the range 15 to 1000 pounds per square inch gauge more preferably 15 to 500 pounds per square inch gauge, and especially 100 to 200 pounds per square inch gauge.

The space velocity at which the process of the invention is carried out may be within a wide range. In the selective hydrogenation of acetylenes in gases containing olefines the space velocity may be in the range 1 to 20,000 litres per litre of catalyst-filled space per hour and is preferably in the range 5000 to 15000 litres per litre of catalyst-filled space per hour. Here as in the rest of this specification values of space velocity refer to 1 atmosphere pressure and 0° C.

The characteristics of the catalyst used in the process of the invention are chosen in relation to the other reaction conditions in order to obtain optimum results. It has been found that in the selective hydrogenation of acetylenes in gases containing olefines the ranges of variation of the characteristics of the catalyst should be as follows:

Mean pore radius 100 to 1400 Angstrom units, and especially 200 to 700 Angstrom units;

Surface area 65 to 5 square metres per gram and more preferably 30 to 10 square metres per gram;

Palladium content up to 5% by weight and more preferably 0.01% to 0.4% by weight.

The characteristics of the catalyst are chosen within the above preferred ranges in relation to reaction conditions for example as follows:

Increased space velocity is made possible by increased palladium content;

Increased temperature is reffuired by increased mean pore radius or by decreased surface area. As an example of reaction conditions which give rise to highly efficient selective hydrogenation of acetylenes in gases containing olefines there may be mentioned the following combinations, which were observed over the first four weeks of the use of the catalyst:

| | |
|---|---|
| Inlet gas temperature | 70° C. |
| Pressure | 150 to 170 p.s.i.g. |
| Space velocity | 7000 hr.⁻¹ |
| Surface area | 20 m.²/g. |
| Mean pore radius | 296 A. |
| Palladium content | 0.04% by weight. |

However the process does not depart seriously from its optimum performance over quite large ranges of reaction conditions and catalyst characteristics within the preferred ranges.

As examples of gas mixtures which may be treated by the process of the invention there may be mentioned mixtures of olefines and acetylenes provided that when the acetylenes concentration is high their pressure is kept below the dangerous limit and suitable precautions are taken to dissipate the heat of the reaction. The invention is especially applicable to gas mixtures in which ethylene and/or propylene are the major olefinic constituents. The acetylenes content is preferably below about 2%. There may be present in addition to ethylene and/or propylene major constituents and acetylenes as undesirable minor constituents small proportions (preferably not over 1%) of higher olefines such as $C_4$ and higher olefines as well as paraffinic hydrocarbons and other materials which are inert under the conditions of the selective hydrogenation process. Substances which poison the catalyst, for example, sulphur compounds, should be substantially absent. The amount of hydrogen present should be at least sufficient to hydrogenate the acetylenes to the corresponding olefines and may be present in large excess e.g. 10 times or up to 1000 times and more without detriment to the selectivity of the catalyst. The hydrogen may be present originally in the gas mixture being treated or it may be added before treatment. Thus the process of the invention may be applied to olefine-containing gases as produced by the cracking plant especially a mixture containing 5% to 20% hydrogen, 10% to 45% ethylene, 10% to 18% propylene and unreactive gases such as methane and also to olefines which have been separated but still require final purification from residual acetylenic impurities.

As a preferred embodiment the invention provides a process for the selective hydrogenation of acetylenes in gases containing olefines characterised in that in treating an inlet gas comprising up to 2% acetylenes, hydrogen in quantity at least sufficient to hydrogenate the acetylenes to olefines and up to 20%, up to 1% of $C_4$ and higher olefines, and ethylene and/or propylene, there is used a catalyst having a mean pore radius in the range 200 to 700 Angstrom units, having a surface area in the range 30 to 10 square metres per gram, and having a palladium content in the range 0.01 to 0.4%, the process being carried out at a temperature in the range 60° C. to 150° C., a total pressure up to 1000 pounds per square inch gauge and a space velocity in the range 5000 to 15000 litres per litre of catalyst-filled space per hour.

By the process of the invention acetylenes are hydrogenated efficiently in the presence of olefines with only slight hydrogenation of the olefines present. Conversions of 95% and more of the acetylenes are readily obtained, with 1% or less of the olefines hydrogenated. The process may be carried on for long periods without interruptions caused for instance by the accumulation of polymeric matter on the catalyst or in the plant. Its effectiveness and selectivity are but slightly affected by changes in reaction conditions: considerable increases of temperature can be made within the preferred ranges when required, for example in order to make possible an increase in space velocity, without bringing about runaway hydrogenation of the olefines. The process is of particular value in large scale operations where it enables high throughputs to be maintained without the adoption of expensive arrangement for temperature adjustment and control.

The invention is illustrated by the following examples in which the percentages are by volume unless otherwise stated.

*Example 1*

The following experiments illustrate the effectiveness of the palladium-on-alumina catalysts of the invention in the selective hydrogenation of acetylenes, the alumina having been heated to various temperatures.

The catalysts were prepared by the following general procedure:

2.36 kg. of γ-alumina pellets (⅛″ diameter) were heated for 2 hours at 1100° C. A solution of palladium nitrate was also prepared by dissolving 2.1 gm. palladium nitrate (≡0.945 gm. Pd) in 100 ml. water, adding 20 ml. of a 40% aqueous solution of nitric acid and diluting to 920 ml. with distilled water.

The pellets and the palladium nitrate solution were then mixed and the resulting mixture dried at 120° C. and reduced in the presence of hydrogen at 400° C. Analysis showed the resulting catalyst pellets to contain 0.045% palladium by weight.

Catalyst pellets using γ-alumina heated at temperatures other than 1100° C. were prepared similarly.

The catalyst pellets were packed into a tube arranged vertically and a gas containing 13% of hydrogen, 35% ethylene and 0.4% acetylenes passed through the catalyst at a space velocity of 7000 litres per litre of catalyst filled space per hour and under a pressure of 150 p.s.i.g. The temperature required to achieve 90% conversion of the acetylenes was determined. This and the other relevant data are given in the following table.

TABLE 1

| Aluminia heated at °C | 650 | 900 | 1,000 | 1,100 | 1,200 | 1,300 |
|---|---|---|---|---|---|---|
| Mean pore radius, A | 84 | 156 | 278 | 677 | 1,380 | 2,630 |
| Total surface area of catalyst, m.²/gm | 73.7 | 40.6 | 22.1 | 11.0 | 5.6 | 2.6 |
| Temperature for 90% acetylene conversion, °C | | 70-75 | 75-80 | 85-90 | 90-95 | 90-95 |
| Average percent ethylene saturation at 90% acetylene conversion | | 0.5-1.0 | 0.5 | 0.5 | 0.1 | 0.5 |

Using alumina heated at 650° C. 90% conversion of acetylene was not achieved consistently. The reaction temperature was also difficult to control i.e. a runaway reaction tended to occur giving reaction temperatures of up to 200° C.

No runaway reaction occurred when using alumina heated at the higher temperatures.

*Example 2*

A quantity of ⅛″ x ⅛″ cylindrical γ-alumina pellets was heated to 1020° C. over 18 hours, heated for 6 hours at 1020° C., cooled to room temperature over 18 hours and mixed with 1.1 times its weight of a solution of palladium nitrate (0.08% w./v.) and nitric acid (0.7% w./v.). The resulting mixture was dried in air at 100° C. for 24 hours, allowed to cool for 1 hour in air at room temperature, then transferred to sealed vessels for storage. The mean pore radius of this batch of catalyst was found to be 296 Angstrom units and the average surface area of the catalyst was found to be 20 m.²/g.

The impregnated pellets containing 0.04% palladium by weight were charged to a convertor in which at a pressure of 150–170 pounds per square inch (gauge), inlet gas temperature at 70° C. and a space velocity of 7000 litres per hour per litre of catalyst filled space, there was passed over it the following mixture.

| | |
|---|---|
| Hyrogen | 14%. |
| Methane | 30%. |
| Acetylene | 2000 to 3300 parts per million. |
| Methyl acetylene | 2000 to 3300 parts per million. |
| Ethylene | 35%. |
| Ethane | 5%. |
| Propylene | 15%. |
| Propane | 0.5%. |
| C₄ hydrocarbons | 0.5%. |

The gas leaving the convertor was found to contain only 100 parts per million of acetylenes. It was condensed and fractionated, giving an ethylene fraction containing under 25 parts per million of acetylenes. After operation in this manner for 22 weeks a similar reduction in the content of acetylenes was still obtained but a temperature of 110° C. was now required. During this period the average percentage of ethylene saturated was less than 1.5%.

In experimental runs using a further sample of the same caatlyst in a side stream of the same gas as was treated in the above-mentioned convertor the following effects were investigated and results obtained.

(1) C₄ olefine content increased to 1% _____ No change, that is, no temperature changes of the type found when olefine hydrogenation takes place. Acetylene removal unaffected.

(2) Increases of space velocity of 10000 hr.⁻¹____ Conversion decreased but was restored to its original value by increasing the temperature by between 5° C. and 10° C.

*Example 3*

Two catalysts prepared as described in Example 2 with the exception that the palladium content of one of them was 0.15% by weight were compared in the treatment of the same gas stream as was used in Example 2. The catalysts were substantially equal in age. It was found that the catalyst containing the higher quantity of palladium could be used at a higher space velocity for a given temperature, or alternatively could be used at a lower temperature for the same space velocity, as is shown in the table.

TABLE 2

OPTIMUM TEMPERATURES AT TWO LEVELS OF SPACE VELOCITY FOR CATALYSTS CONTAINING TWO QUANTITIES OF PALLADIUM

| Palladium content, percent by weight | Space Velocity hr.⁻¹ | |
|---|---|---|
| | Low | High |
| 0.04 | 76–77° C. (94–97% conversion 7,000 hr.⁻¹). | 82–84° C. (96% conversion 9,000 hr.⁻¹). |
| 0.15 | 71–74 °C. (94–96% conversion 7,000 hr.⁻¹). | 72–73° C. (91–93% conversion 10,000 hr.⁻¹). |

I claim:

1. A process for the selective hydrogenation of acetylenes in gases containing olefins which comprises reacting the mixture of gases with hydrogen at a temperature up to 250° C. and in the presence of a catalyst which consists of palladium supported on alumina whose pores have a mean radius in the range 200 to 1400 Angstrom units and which has a surface area in the range 32 to 5 square meters per gram.

2. A process as claimed in claim 1 wherein the temperature is in the range 60° C. to 150° C.

3. A process as claimed in claim 1 wherein the catalyst is brought into contact with the reaction mixture without having been previously heated at over 150° C. and without having been previously contacted with hydrogen.

4. A process as claimed in claim 1 wherein the catalyst has a mean pore radius in the range 200 to 700 Angstrom units, a surface area in the range 30 to 10 square meters per gram and a palladium content in the range 0.01% to 0.4% by weight.

5. A process as claimed in claim 1 wherein the acetylenes content of the gas mixture to be treated is at most 2% and the proportion of C₄ and higher olefins is at most 1%.

6. A process as claimed in claim 1 wherein the pressure is in the range 15 to 1000 pounds per square inch gauge.

7. A process as claimed in claim 1 wherein the space velocity is in the range 1 to 20,000 liters per liter of catalyst filled space per hour.

8. A process for the selective hydrogenation of acetylenes in gases containing olefins which comprises contacting an inlet gas comprising up to 2% acetylenes, hydrogen at least sufficient to hydrogenate the acetylenes to olefins, and up to 1% C₄ and higher olefins and at least one olefin selected from ethylene and propylene with a catalyst consisting of palladium supported on alumina whose mean pore radius is in the range 200 to 700 Angstrom units, whose surface area is in the range 30 to 10 square meters per gram, the palladium content of the catalyst being in the range 0.01% to 0.4%, the process being carried out at a temperature in the range 60° C. to 150° C., at a total pressure in the range 15 to 1000 pounds per square inch gauge, and a space velocity in the range 5000 to 15000 liters per liter of catalyst-filled space per hour.

9. A process as claimed in claim 8 wherein the ethylene content is in the range 10% to 45% and the propylene content is in the range 10% to 18%.

10. A process for the selective hydrogenation of acetylenes in gases containing olefins which comprises contacting an inlet gas comprising up to 2% of acetylenes, 5 to 20% of hydrogen, 10 to 45% ethylene, 10 to 18% propylene and up to 1% of higher olefins over a catalyst consisting of palladium supported on alumina whose mean pore radius is in the range 200 to 700 Angstrom units, whose surface area is in the range 30 to 10 square meters per gram, the palladium content of the catalyst being in the range 0.01% to 0.4%, the process being carried out at a temperature in the range 60° C. to 150° C., at a total pressure in the range 15 to 1000 pounds per square inch gauge and a space velocity in the range 5000 to 15000 liters per liter of catalyst-filled space per hour.

11. A catalyst suitable for mild hydrogenation reactions such as the selective hydrogenation of acetylenes in the presence of olefins which consists of palladium supported on alumina whose pores have a mean radius in the range 200 to 1400 Angstrom units and which has a surface area in the range 32 to 5 square meters per gram.

12. A catalyst as claimed in claim 11 wherein the mean radius of the pores of the alumina is in the range 200 to 700 Angstrom units.

13. A catalyst as claimed in claim 11 having a surface area in the range 30 to 10 square meters per gram.

14. A catalyst as claimed in claim 11 having a palladium content in the range 0.01% to 0.4% by weight.

References Cited in the file of this patent

UNITED STATES PATENTS

| | | |
|---|---|---|
| 2,542,970 | Jones | Feb. 27, 1951 |
| 2,802,889 | Frevel et al. | Aug. 13, 1957 |
| 2,854,403 | Weisz | Sept. 30, 1958 |
| 2,887,455 | Cornelius et al. | May 19, 1959 |
| 2,909,578 | Anderson et al. | Oct. 20, 1959 |
| 2,946,829 | Likins et al. | July 26, 1960 |
| 2,982,720 | Yeo et al. | May 2, 1961 |
| 2,982,793 | Turner et al. | May 2, 1961 |